United States Patent
Lim et al.

(10) Patent No.: US 10,708,825 B2
(45) Date of Patent: *Jul. 7, 2020

(54) CELLULAR WIRELESS NETWORK AND METHOD OF OPERATION

(71) Applicant: Alcatel Lucent, Boulogne Billancourt (FR)

(72) Inventors: Seau Sian Lim, Swindon (GB); Sudeep Kumar Palat, Swindon (GB)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 15/241,583

(22) Filed: Aug. 19, 2016

(65) Prior Publication Data

US 2017/0041771 A1    Feb. 9, 2017

Related U.S. Application Data

(63) Continuation of application No. 13/256,677, filed as application No. PCT/EP2010/001671 on Mar. 17, 2010, now Pat. No. 9,426,637.

(30) Foreign Application Priority Data

Mar. 17, 2009   (EP) ..................................... 09290195

(51) Int. Cl.
*H04L 29/06* (2006.01)
*H04W 36/00* (2009.01)
(Continued)

(52) U.S. Cl.
CPC ..... *H04W 36/0022* (2013.01); *H04L 12/1895* (2013.01); *H04L 65/1016* (2013.01);
(Continued)

(58) Field of Classification Search
CPC ..... H04W 4/22; H04W 36/0022; H04W 4/90; H04W 76/50; H04W 48/16; H04W 48/18;
(Continued)

(56) References Cited

U.S. PATENT DOCUMENTS

2006/0114871 A1   6/2006   Buckley et al.
2007/0032219 A1   2/2007   Rudolf et al.
(Continued)

FOREIGN PATENT DOCUMENTS

| CN | 101352058 A | 1/2009 |
|---|---|---|
| EP | 2 026 513 A1 | 2/2009 |
| JP | 2009-535944 | 10/2009 |

OTHER PUBLICATIONS

3GPP, "Support for IMS Emergency Calls over GPRS and EPS," Release 9, Feb. 2009, 3GPP TG 23.869 VO.7.0., 37 pages.
(Continued)

*Primary Examiner* — Faisal Choudhury
(74) *Attorney, Agent, or Firm* — Fay Sharpe LLP

(57) ABSTRACT

A method of operating a cellular wireless network comprises broadcasting information about Internet Multimedia Subsystem (IMS) emergency call capability of the network on a broadcast channel in a cell of the network. This information may in one method concern the IMS emergency call capability of a base station included in the network and in another method it may include IMS emergency call capability of a base station and the core network.

16 Claims, 2 Drawing Sheets

(51) Int. Cl.
*H04W 76/50* (2018.01)
*H04W 4/90* (2018.01)
*H04L 12/18* (2006.01)
*H04W 48/16* (2009.01)
*H04W 48/18* (2009.01)

(52) U.S. Cl.
CPC .............. *H04W 4/90* (2018.02); *H04W 76/50* (2018.02); *H04M 2207/18* (2013.01); *H04M 2242/04* (2013.01); *H04W 48/16* (2013.01); *H04W 48/18* (2013.01)

(58) Field of Classification Search
CPC ............ H04L 12/1895; H04L 65/1016; H04M 2207/18; H04M 2242/04
USPC ......................................................... 370/331
See application file for complete search history.

(56) References Cited

U.S. PATENT DOCUMENTS

| | | |
|---|---|---|
| 2007/0153982 A1 | 7/2007 | Bloebaum et al. |
| 2007/0153983 A1 | 7/2007 | Bloebaum et al. |
| 2007/0153984 A1 | 7/2007 | Bloebaum et al. |
| 2007/0153986 A1 | 7/2007 | Bloebaum et al. |
| 2007/0254625 A1 | 11/2007 | Edge |
| 2008/0014956 A1 | 1/2008 | Balasubramanian |
| 2008/0267153 A1 | 10/2008 | Mukherjee et al. |
| 2009/0047922 A1* | 2/2009 | Buckley .................. H04L 63/08 455/404.1 |
| 2009/0098851 A1 | 4/2009 | Liebhart |
| 2009/0191841 A1 | 7/2009 | Edge et al. |
| 2010/0048160 A1 | 2/2010 | Lekutai |
| 2010/0054209 A1 | 3/2010 | Mahdi |
| 2010/0240338 A1 | 9/2010 | Mallick et al. |
| 2010/0297979 A1 | 11/2010 | Watfa et al. |
| 2011/0028120 A1* | 2/2011 | Wu ................... H04W 36/0022 455/404.1 |
| 2011/0141910 A1 | 6/2011 | Rosik |
| 2011/0171929 A1 | 7/2011 | Tamura et al. |
| 2011/0274012 A1 | 11/2011 | Jang et al. |
| 2012/0264428 A1* | 10/2012 | Lecompte .............. H04W 48/18 455/435.1 |

OTHER PUBLICATIONS

PCT International Search Report, Application No. PCT/EP 2010/001671, dated Jul. 16, 2010, 3 pages.

English Bibliography for Japanese Patent Application No. JP 2009-535944 A; published Jan. 1, 2009; printed from Thomson Innovation on Aug. 4, 2016, 4 pages.

English Bibliography for Chinese Patent Application No. CN 101352058 A; published Jan. 21, 2009; printed from Thomson Innovation on Aug. 4, 2016, 5 pages.

R2-092173, IMS Emergency Call, 3GPP TSG-RAN WG2 Meeting #65bis, Mar. 23-27, 2009, Seoul, Korea, 6 pp.

R2-092174, Emergency Support Indication for IMS emergency call, 3GPP TSG-RAN WG2 Meeting #65bis, Mar. 23-27, 2009, Seoul, Korea, 3 pp.

* cited by examiner

CELLULAR WIRELESS NETWORK AND METHOD OF OPERATION

This application is a continuation of U.S. patent application Ser. No. 13/256,677, filed on Nov. 23, 2011, which was the National Stage of International Application No. PCT/EP2010/001671, filed Mar. 17, 2010, which claims the benefit of priority from European Patent Application No. EP 09290195.8 filed on Mar. 17, 2009, each of which is hereby incorporated herein by reference in its entirety.

BACKGROUND OF THE INVENTION

The present invention relates to a cellular wireless network and a method of operating such a network.

A significant concern for cellular wireless networks is the handling of emergency calls made by a mobile terminal (UE). For example, Long Term Evolution (LTE) networks are packet-switched (PS) networks but emergency calls have typically been handled in the circuit-switched (CS) domain. With IMS (IP Multimedia System), it is also possible to initiate an emergency call via the PS network. However, in order for a UE to make an IMS emergency call, the UE must know if the network, typically comprising a plurality of base stations and a packet core, also termed herein a core network (CN), is IMS emergency call capable. Delays may occur if the UE cannot make an emergency call when required and must find an alternative arrangement to make the emergency call.

A solution has been proposed for use in networks complying with 3rd Generation Partnership Project (3GPP) standards in which the core network indicates the network support of IMS emergency call in the signaling procedure. However, this method by itself does not cover all scenarios, for example, it may be insufficient where the UE is in limited service state. In limited service state, for example, where a UE has no SIM, the UE may not perform any signaling procedure with the network, and thus the UE will not know if the network supports IMS emergency calls. Furthermore, the proposed solution assumes that if the core network supports IMS emergency calls, then the base station necessarily supports it also. The present inventors have realized that this assumption may not be applicable, for example, during a real deployment scenario where the core network is upgraded before the base stations are upgraded. Both the packet core and the base station to which the UE is attached must be capable of handling IMS emergency calls for the UE to be able to make such a call.

Signaling between packet core and the UE is addressed in 3GPP TS 24.301 "Non-Access-Stratum (NAS) protocol for Evolved Packet System (EPS)".

BRIEF SUMMARY

According to a first aspect of the invention, a method of operating a cellular wireless network comprises broadcasting information about packet switched emergency call capability of the network on a broadcast channel in a cell of the network. The broadcast information may include information about at least one of network support, local regulation and operators policy regarding packet switched emergency calls. In one embodiment, the emergency call capability is the IMS emergency call capability but other packet switched protocols may be used if available.

In one method, the broadcast information includes the emergency call capability of an access node included in the network. The access node may be, for example, an eNodeB base station in accordance with LTE standards, but the invention may be applied to other technology type networks. In one method, signaling between a mobile terminal (UE) and a network node is used to send information about the packet switched emergency call capability of the packet core to the UE. The packet core emergency call capability information may be sent to the UE during handover procedures, for example, although other timing may be used if convenient.

Use of the invention may provide a flexible and efficient way for the network to indicate to the UE its support of IMS emergency calls, or other packet switched emergency calls, for example, and may also complement other approaches.

A method in accordance with the invention may provide a way of indicating the network emergency call capability to the UE regardless of what state the UE is in. It may provide improved call setup times when the UE is in the limited service state. It may allow the UE to know the network emergency call capability without requiring the UE to camp on the cell, enabling the UE to make a decision about what it wants to do before it camps on the cell without requiring network signaling. A method in accordance with the invention may allow the base station to be non-IMS emergency call capable while the core network is IMS emergency call capable, without the UE assuming that full IMS emergency call availability is available to it. This provides flexibility to upgrade scenarios where different parts of a network are upgraded at different times.

In one method in accordance with the invention, the broadcast information includes the packet switched emergency call capability of the packet core.

According to a second aspect of the invention, a base station for a cellular wireless network comprises a transmitter arranged to broadcast information about packet switched emergency call capability of the network on a broadcast channel in a cell of the network. The broadcast information may include information about at least one of network support, local regulation and operators policy regarding packet switched emergency calls. In one embodiment, the emergency call capability is the IMS emergency call capability but other packet switched protocols may be used if available.

According to a third aspect of the invention, a cellular wireless network comprises a network node arranged to broadcast information about Internet packet switched emergency call capability of the network on a broadcast channel in a cell of the network. The broadcast information may include information about at least one of network support, local regulation and operators policy regarding packet switched emergency calls. In one embodiment, the emergency call capability is the IMS emergency call capability but other packet switched protocols may be used if available.

According to a fourth aspect of the invention, a mobile terminal for use with a wireless cellular network comprises a receiver for receiving a broadcast channel of a base station and detecting information on the broadcast channel about the packet switched emergency call capability of the network.

BRIEF DESCRIPTION OF THE DRAWINGS

Some embodiments of the present invention will now be described by way of example only, and with reference to the accompanying drawings, in which.

DETAILED DESCRIPTION

In an LTE cellular wireless network comprising a plurality of bases stations and a packet core, the network broadcasts the packet switched emergency call capability on a broadcast channel. In the following examples, the emergency call capability is the IMS emergency call capability. The indication of the emergency call capability may be the IMS emergency call capability of the base station only (described under Case 1 below) or a combined capability indication of both the base station and the core network (described under Case 2 below.)

Figure 1:
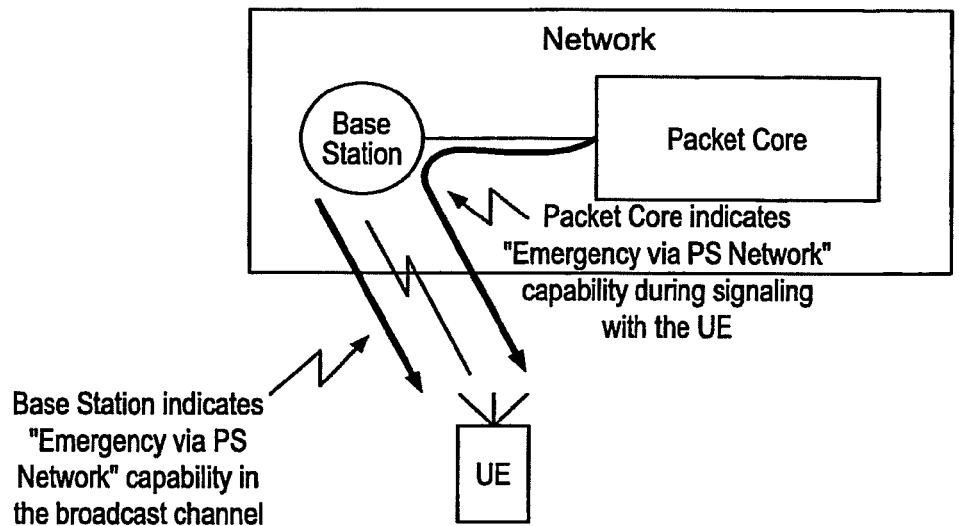
FIG. 1 schematically illustrates a network in accordance with the invention.

With reference to FIG. 1, in Case 1, a previous solution, where the UE is independently informed about packet core emergency call capability via signaling, is complemented by also sending information about the base station emergency call capability via the broadcast channel. The UE will only make an IMS emergency call if both the packet core and the base station support IMS emergency calls. If this is not possible, the UE may find an alternative means to make an emergency call.

When a UE with a SIM first turns on, it selects a cell and performs an initial attach procedure to the packet network via a selected base station. In the meantime, it discovers if the base station supports IMS emergency calls via information transmitted on the broadcast channel. Once the initial attach is completed, the UE knows if the packet core supports IMS emergency calls. If both the packet core and the base station indicate support, the UE is allowed to perform IMS emergency calls in the cell. If either one indicates that it does not support IMS emergency calls, the UE may, for example, decide to select another cell which supports IMS emergency calls or camp on a cell which allows Circuit Switched emergency calls. Whenever a UE camps on a cell after call release or initial attach, it reads the broadcast channel to ascertain the network capability.

When the UE moves from one cell to another in the same tracking area/location area, it updates the base station emergency call capability so that it has up to date information about the overall to IMS emergency call capability. When the UE moves from one cell in one tracking area/location area to another cell in a different tracking area/location area, not only the base station IMS emergency call capability is updated but also the packet core capability may be updated.

During handover with no IMS emergency call, the UE can find out whether the target cell supports IMS emergency call capability via the broadcast channel and know the packet core capability via the tracking area update/location update procedure.

During handover with an ongoing IMS emergency call, if the target cell and core network support IMS emergency calls, the handover will be accepted and the IMS emergency call can proceed in the target cell. Otherwise the handover is rejected and the source cell must decide what to do.

If the UE camps on a cell in limited service state due to having no SIM, for example, it can at least obtain the base station IMS emergency call capability from the broadcast channel and use that information to decide whether to stay in that cell or to select another cell which supports CS emergency calls. If the UE camps on a cell in limited service state due to forbidden location area/tracking area, roaming not allowed et cetera, it knows the packet core IMS emergency call capability from the signaling procedure.

Figure 2:
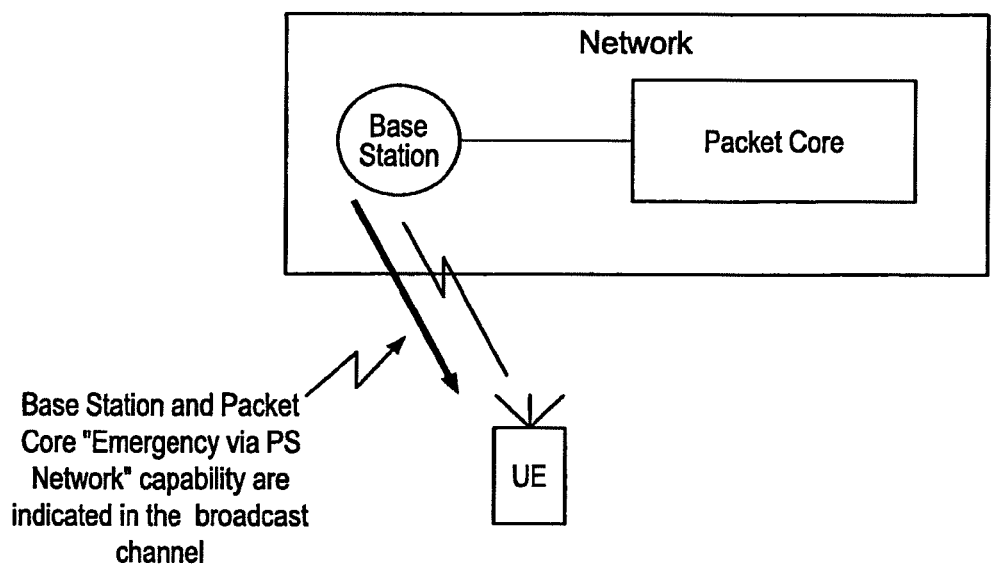
FIG. 2 schematically illustrates a network in accordance with the invention.

With reference to FIG. 2, in Case 2, it is assumed that the combined packet switched emergency call capability of the packet core and the base station is indicated in the broadcast channel. This method does not require an indication from the packet core signaling procedure to determine emergency call capability. When a UE with a SIM first turns on, it selects a cell and reads the broadcast channel to check if the network supports IMS emergency calls. If the network supports that capability, the UE can camp on the cell as a suitable cell after successfully attaching and is able to make IMS emergency calls thereafter. If the network does not support the capability, the UE may still camp on the cell as suitable cell after successful attach but must revert to circuit switched emergency calls or select any cell of another RAT (Radio Access Technology) that supports circuit switched voice service.

When the UE cell reselects, it updates the network capability to the current serving cell. If the serving cell does not support IMS emergency calls, the UE may still camp on the cell as a suitable cell (if no tracking area update or if successful tracking area update) but must revert to circuit switched emergency calls or select any cell of another RAT that supports circuit switched voice service.

During handover with no IMS emergency call, the UE discovers if the target cell supports IMS emergency calls via the broadcast channel.

During handover with an ongoing IMS emergency call, the source base station determines if the target packet core and target cell supports IMS emergency calls via the 'handover required' message. If the target packet core and target cell support the capability, a positive acknowledgement to the 'handover required' message is received by the source base station and IMS emergency call proceeds in the target cell. If either the target packet core or target cell do not support the capability, the handover is rejected and the source base station may need to find an alternative way to continue the emergency call, for example, switching to circuit switched voice call or finding another RAT that supports IMS emergency calls, e.g. UTRAN.

If the UE is in limited service state due to no SIM or other reasons, for example, forbidden tracking area or no roaming allowed, the UE reads the capability indication from the broadcast channel and decides whether to stay (if IMS emergency call is supported) or to move to another cell that supports the capability or any cell of another RAT that supports Circuit Switched emergency call (if IMS emergency call is not supported.)

In a shared network, a base station (or eNodeB in LTE) may support more than one CN from different public land mobile networks (PLMN). Some of the CNs may support IMS emergency calls. Providing at least one CN supports IMS emergency calls, the indication on the broadcast channel shows that it supports IMS emergency calls. In this case, when the UE makes an IMS emergency call, the base station should setup the call via the CN that support IMS emergency calls.

Figure 3A:
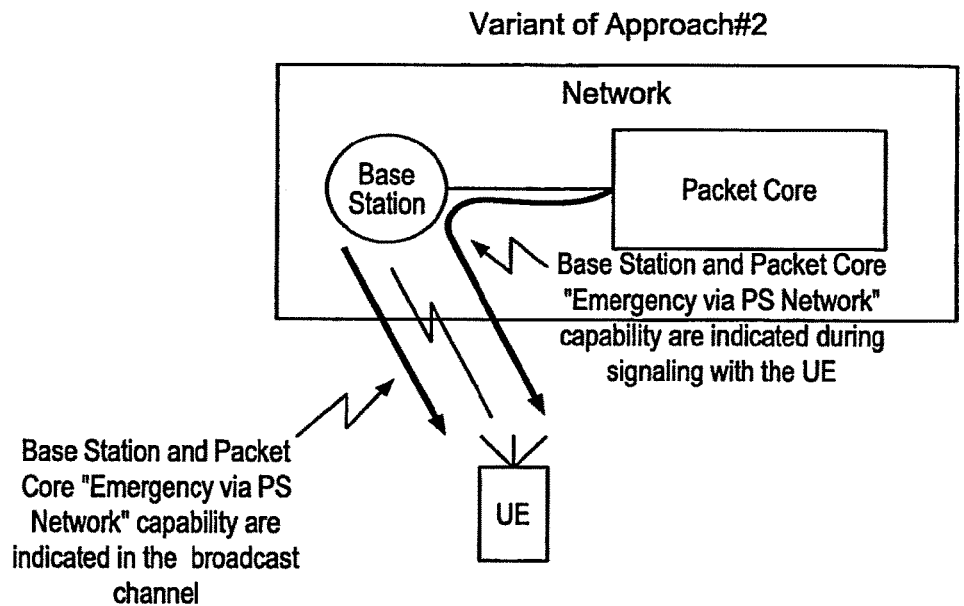
FIGS. 3A and 3B schematically illustrate a network in accordance with the invention.
Figure 3B:
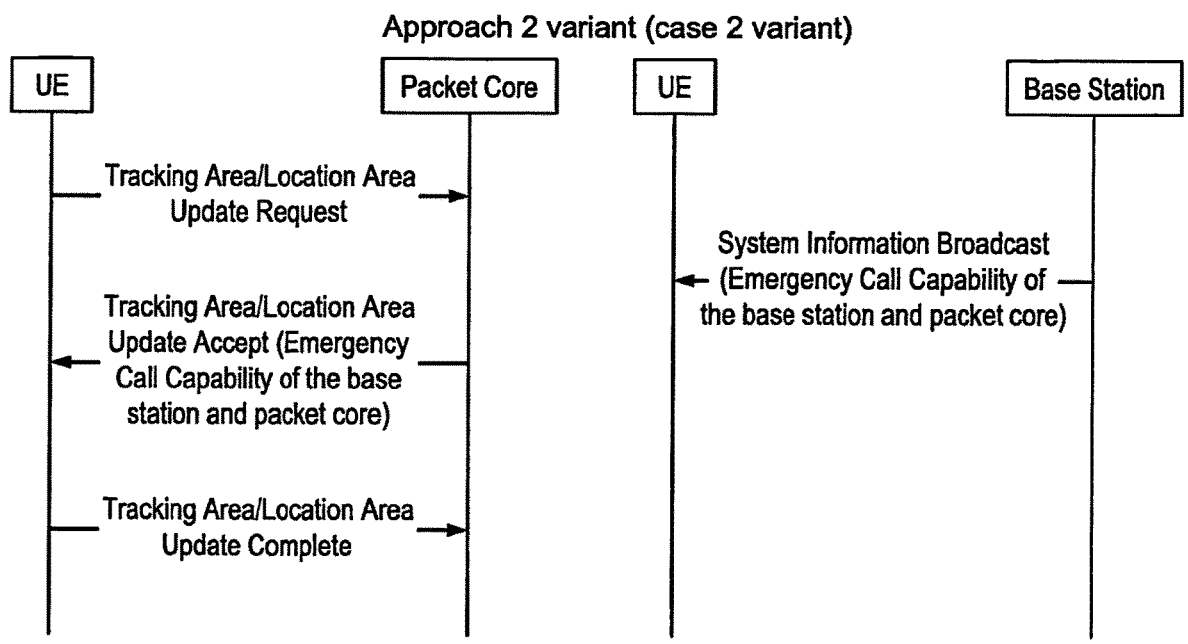

With reference to FIGS. 3A and 3B, in a variant to Case 2, the base station and packet core IMS emergency call capability is sent in both the broadcast channel and the packet core signaling to the UE. This method indicates the emergency call capability of the base station and the packet core in both the broadcast channel and the packet core signaling to the UE. When a UE with a SIM first turns on, it selects a cell and performs an initial attach procedure to the core network. Once the initial attach is completed, it knows if the core network and base station supports IMS emergency call. If it indicates support, the UE is allowed to perform IMS emergency calls in the cell. If it is not supported, the UE may decide to select another cell which supports IMS emergency calls or camp on a cell which allows Circuit Switched emergency calls.

When the UE moves from one cell to another in the same tracking area/location area, the UE knows the capability of the entered cell via the broadcast channel. When the UE moves from one cell in one tracking area/location area to another cell in a different tracking area/location area, the UE knows the capability either via the broadcast channel or the tracking area update/location update procedure.

During handover with no IMS emergency call, the UE determines if the target cell supports the IMS emergency call capability via the broadcast channel or from the packet core via the tracking area update/location update procedure if there is a change of tracking area or location area.

During handover with an IMS emergency call, if the target cell and core network support IMS emergency calls, the handover is accepted and the IMS emergency call proceeds in the target cell. Otherwise, the handover is rejected and the source cell must decide what to do.

If the UE is in limited service state due to no SIM or for other reasons, the UE reads the capability indication from the broadcast channel and decides whether to stay (if IMS emergency call is supported) or to move to another cell that supports the capability or to any cell of another RAT that supports Circuit Switched emergency call (if IMS emergency call is not supported.)

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

We claim:

1. A method of operating a cellular wireless network, comprising:
broadcasting information about a capability of a cellular wireless network on a broadcast channel in a cell of the cellular wireless network from an access node associated with the cell, wherein the information about the capability includes information about a combined packet switched emergency call capability of a network combination including a packet core of the cellular wireless network and the access node;
allowing a user equipment to perform emergency calls in the cell via the access node where the information broadcast about the capability indicates packet switched emergency calls are supported by the network combination; and
enabling the user equipment to determine packet switched emergency calls are supported or are not supported by the network combination based on the information broadcast from the access node and received by the user equipment without the user equipment participating in a network scheduling procedure;
wherein, after determining packet switched emergency calls are not supported by the network combination, the user equipment elects to: i) not camp on the access node, ii) camp on the access node and, if at least one of the packet core and access node does not support packet switched emergency calls, revert to circuit switched emergency calls while camped on the access node, or iii) camp on the access node and, if the packet core supports packet switched emergency calls but the access node does not support packet switched emergency calls, attempt to attach to another access node associated with the packet core that supports packet switched emergency calls.

2. The method of claim 1 wherein the broadcast information includes information about at least one of local regulation and operator's policy regarding packet switched emergency calls.

3. The method of claim 1 wherein the combined packet switched emergency call capability is an Internet Protocol Multimedia Subsystem (IMS) emergency call capability.

4. The method of claim 1 wherein the broadcast information includes an Internet Protocol Multimedia Subsystem (IMS) emergency call capability of the access node;
wherein the access node is an eNodeB base station in accordance with Long Term Evolution (LTE) standards.

5. The method of claim 1 wherein signaling between the user equipment and a network node includes sending packet core capability information about packet switched emergency call capabilities of the packet core of the cellular wireless network to the user equipment;
wherein the packet core capability information is sent to the user equipment during handover procedures.

6. The method of claim 1 wherein the broadcast information includes an Internet Protocol Multimedia Subsystem (IMS) emergency call capability of the packet core.

7. A base station for a cellular wireless network, the base station comprising:
a transmitter configured to broadcast information about a capability of a cellular wireless network on a broadcast channel in a cell of the cellular wireless network, wherein the base station is associated with the cell, wherein the information about the capability includes information about a combined packet switched emergency call capability of a network combination including a packet core of the cellular wireless network and the base station; and
at least one processor and associated memory configured to allow a user equipment to perform emergency calls in the cell where the information broadcast about the capability indicates packet switched emergency calls are supported by the network combination;
wherein the at least one processor and transmitter are configured to enable the user equipment to determine packet switched emergency calls are supported or are not supported by the network combination based on the information broadcast from the transmitter and received by the user equipment without the user equipment participating in a network scheduling procedure;
wherein, after determining packet switched emergency calls are not supported by the network combination, the user equipment elects to: i) not camp on the base station, ii) camp on the base station and, if at least one of the packet core and base station does not support packet switched emergency calls, revert to circuit switched emergency calls while camped on the base station, or iii) camp on the base station and, if the packet core supports packet switched emergency calls but the base station does not support packet switched emergency calls, attempt to attach to another base station associated with the packet core that supports packet switched emergency calls.

8. The base station of claim 7 wherein the broadcast information includes information about at least one of local regulation and operator's policy regarding packet switched emergency calls.

9. The base station of claim 7 wherein the combined packet switched emergency call capability is an Internet Protocol Multimedia Subsystem (IMS) emergency call capability.

10. The base station of claim 7 wherein the broadcast information includes an Internet Protocol Multimedia Subsystem (IMS) emergency call capability of the packet core.

11. The base station of claim 7 wherein the broadcast information includes an Internet Protocol Multimedia Subsystem (IMS) emergency call capability of the base station; wherein the base station is an eNodeB in accordance with Long Term Evolution (LTE) standards.

12. The base station of claim 7 wherein signaling between the user equipment and a network node includes sending packet core capability information about packet switched emergency call capabilities of the packet core of the cellular wireless network to the user equipment; wherein the packet core capability information is sent to the user equipment during handover procedures.

13. A mobile terminal for use with a cellular wireless network, the mobile terminal comprising
    a receiver configured to receive information about a capability of a cellular wireless network on a broadcast channel in a cell of the cellular wireless network from a base station associated with the cell, wherein the information about the capability includes information about a combined packet switched emergency call capability of a network combination including a packet core of the cellular wireless network and the base station; and
    at least one processor configured to detect the information on the broadcast channel concerning the combined packet switched emergency call capability of the network combination;
    wherein the at least one processor is configured to perform emergency calls in the cell via the base station where the information broadcast about the capability indicates packet switched emergency calls are supported by the network combination;
    wherein the at least one processor is configured to process the information received on the broadcast channel to determine packet switched emergency calls are supported or are not supported by the network combination based on the information broadcast from the base station and received by the receiver without the mobile terminal participating in a network scheduling procedure;
    wherein, after determining packet switched emergency calls are not supported by the network combination, the at least one processor is configured to elect to: i) not camp on the base station, ii) camp on the base station and, if at least one of the packet core and base station does not support packet switched emergency calls, revert to circuit switched emergency calls while camped on the base station, or iii) camp on the base station and, if the packet core supports packet switched emergency calls but the base station does not support packet switched emergency calls, attempt to attach to another base station associated with the packet core that supports packet switched emergency calls.

14. The mobile terminal of claim 13 wherein the combined packet switched emergency call capability is an Internet Protocol Multimedia Subsystem (IMS) emergency call capability.

15. A method of operating a cellular wireless network, comprising:
    receiving information about a capability of a cellular wireless network at a mobile terminal on a broadcast channel in a cell of the cellular wireless network from an access node associated with the cell, wherein the information about the capability includes information about a combined packet switched emergency call capability of a network combination including a packet core of the cellular wireless network and the access node;
    detecting the information on the broadcast channel at the mobile terminal concerning the combined packet switched emergency call capability of the network combination;
    performing emergency calls from the mobile terminal in the cell via the access node where the information broadcast about the capability indicates packet switched emergency calls are supported by the network combination; and
    processing the information received on the broadcast channel at the mobile terminal to determine packet switched emergency calls are supported or are not supported by the network combination based on the information broadcast from the access node and received by the mobile terminal without the mobile terminal participating in a network scheduling procedure;
    wherein, after determining packet switched emergency calls are not supported by the network combination, the mobile terminal elects to: i) not camp on the access node, ii) camp on the access node and, if at least one of the packet core and access node does not support packet switched emergency calls, revert to circuit switched emergency calls while camped on the access node, or iii) camp on the access node and, if the packet core supports packet switched emergency calls but the access node does not support packet switched emergency calls, attempt to attach to another access node associated with the packet core that supports packet switched emergency calls.

16. The method of claim 15 wherein the combined packet switched emergency call capability is an Internet Protocol Multimedia Subsystem (IMS) emergency call capability.

* * * * *